United States Patent [19]
Noguchi

[11] Patent Number: 5,594,516
[45] Date of Patent: Jan. 14, 1997

[54] PHOTOGRAPHIC CAMERA

[75] Inventor: Yukio Noguchi, Saitama-ken, Japan

[73] Assignee: Fuji Photo Optical Co., Ltd., Saitama, Japan

[21] Appl. No.: 322,335

[22] Filed: Oct. 13, 1994

[30] Foreign Application Priority Data

Oct. 14, 1993 [JP] Japan .................................. 5-256743

[51] Int. Cl.$^6$ .............................. G03B 1/18; G03B 13/02
[52] U.S. Cl. ........................................ 396/418; 396/373
[58] Field of Search ............................... 354/173.1, 219

[56] References Cited

U.S. PATENT DOCUMENTS

| | | | |
|---|---|---|---|
| 4,401,377 | 8/1983 | Sato et al. ............................. | 354/173 |
| 4,419,000 | 12/1983 | Yoshida et al. ..................... | 354/173.1 |
| 4,996,544 | 2/1991 | Fiorda ................................. | 354/64 |
| 5,119,118 | 6/1992 | Harada et al. ....................... | 354/106 |

Primary Examiner—Michael L. Gellner
Assistant Examiner—Daniel Chapik
Attorney, Agent, or Firm—Fish & Richardson P.C.

[57] ABSTRACT

A photographic camera has a film magazine chamber and a film take-up chamber disposed on opposite sides of an optical system of a viewfinder. A gear train transmits power for taking up the film between the film magazine chamber and the film take-up chamber. The gear train has a power transmission shaft which extends right and left of the camera body and has a length sufficient to extend across the optical system of the viewfinder, and a recess is formed in the contour of the optical system of the viewfinder as viewed from a side of the optical system. The power transmission shaft extends through the recess.

2 Claims, 3 Drawing Sheets

F I G. 2A
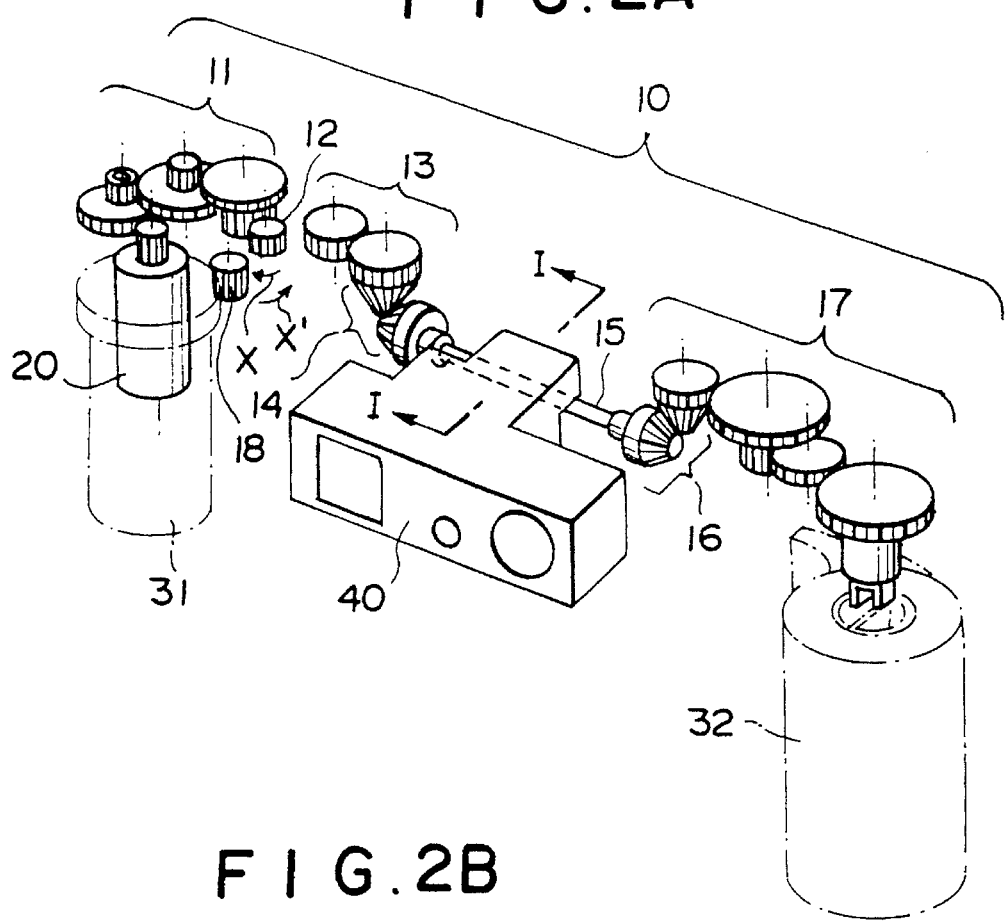
F I G. 2B
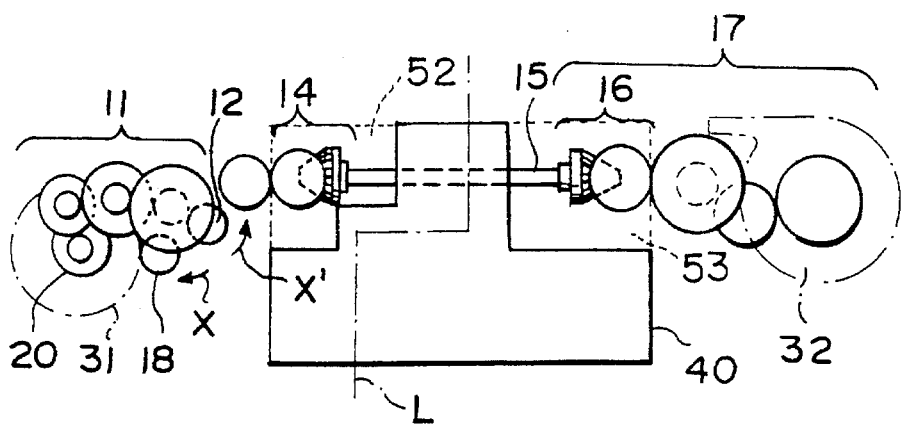
F I G. 2C
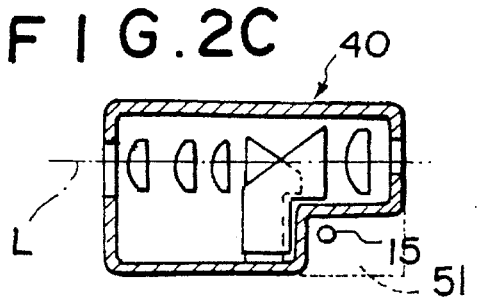

PHOTOGRAPHIC CAMERA

BACKGROUND OF THE INVENTION

1. Field of the Invention

This invention relates to a photographic camera, and more particularly to an improvement in a film feed system in which power is transmitted between a film magazine chamber and a film take-up chamber which are disposed on opposite sides of a viewfinder system.

2. Description of the Prior Art

In a typical photographic camera, the film loaded in the film magazine chamber is fed through the film window for exposure and taken up around a film take-up spool in the film take-up chamber each time a picture is taken. In the camera of this type, the film taken up around the take-up spool is rewound into the film magazine in the film magazine chamber for development after all the frames in the film are exposed.

Recently, in some cameras, the whole film loaded in the film magazine chamber is once taken up into the film take-up chamber before exposure and then rewound into the film magazine in the film magazine chamber through the film window for exposure one frame by one frame each time a picture is taken.

Recently, in major cameras, the film is taken up or rewound by use of a power unit such as an electric motor. In the cameras of this type, the power unit is connected with the film magazine chamber and the film take-up chamber by way of a power transmission mechanism such as a gear train to drive the film spool of the film magazine in the film magazine chamber and/or the film take-up spool in the film take-up chamber.

There has been an increasing demand for miniaturization of cameras from the viewpoint of portability. Though there has been known a mini size camera using a special small size film, there is a problem that resolution of the picture deteriorates and sharpness of the image deteriorates as the film size decreases and at the same time such a special small size film is less available.

Accordingly, it is preferred that the camera be miniaturized while using common films. From this point of view, it is necessary to miniaturize even the power unit and/or the power transmission system.

As the power transmission system, there has been used a gear train extending between the film magazine chamber and the film take-up chamber. Conventionally, the gear train is disposed in the uppermost portion of the camera body in order to avoid interference with the viewfinder system disposed between the film magazine chamber and the film take-up chamber, or is arranged so that portions of the power transmission system on opposite sides of the viewfinder is connected by a power transmission shaft which extends below the optical system of the viewfinder system and the taking lens system bypassing them.

However, when the uppermost portion of the camera body is occupied by the gear train of the power transmission system, miniaturization of the camera is limited by the gear train, and when the portions of the power transmission system on opposite sides of the viewfinder is connected by a power transmission shaft bypassing the optical system of the viewfinder system and the taking lens system, power transmitting efficiency deteriorates.

SUMMARY OF THE INVENTION

In view of the foregoing observations and description, the primary object of the present invention is to provide a miniaturized camera which is smaller than conventional cameras and in which deterioration in power transmitting efficiency is less.

In the camera in accordance with the present invention, a recess is formed in the contour of the optical system of the viewfinder not to obstruct the optical path of light passing through the optical system of the viewfinder and the gear train of the power transmission system is arranged so that a power transmission shaft passes through the recess, i.e., so that the power transmission shaft is enclosed in the size of the overall optical system of the viewfinder, thereby improving the space factor in the camera body, which contributes to miniaturization of the camera.

That is, in accordance with the present invention, there is provided a photographic camera comprising a film magazine chamber and a film take-up chamber disposed on opposite sides of an optical system of a viewfinder and a gear train for transmitting power such as that for taking up the film between the film magazine chamber and the film take-up chamber, wherein the improvement comprises that said gear train has a power transmission shaft which extends right and left of the camera body and has a length sufficient to extend across the optical system of the viewfinder, and a recess is formed in the contour of the optical system of the viewfinder as viewed from a side of the optical system, the power transmission shaft extending through the recess.

In the case where the power transmission shaft is connected to each of the portions of the gear train on opposite sides of the optical system of the viewfinder by way of a means for changing the direction of the rotational axis of the gear train, it is preferred that the optical system of the viewfinder be provided with a recess on each side thereof as viewed from above and said means for changing the direction of the rotational axis of the gear train be disposed in the recess.

In accordance with the camera of the present invention, the power transmission system comprises a gear train and a power transmission shaft which are small in thickness, and the power transmission shaft is passed through a small recess formed in the optical system of the viewfinder. Accordingly, the power transmission shaft can be enclosed in the size of the overall optical system of the viewfinder and the power transmission system need not extend beyond the upper or lower edge of the optical system of the viewfinder, whereby the size of the overall camera body can be reduced. Further since the power transmission system need not be arranged so as to bypass the viewfinder system and the taking lens system, the power transmitting efficiency can be improved.

Further though in a camera where the power transmission shaft is connected to each of the portions of the gear train on opposite sides of the optical system of the viewfinder by way of a means for changing the direction of the rotational axis of the gear train, the means is apt to occupy a large space and to add to the overall size of the camera, the space for the means for changing the direction of the rotational axis of the gear train can be saved by forming a recess in the optical system of the viewfinder on each side thereof as viewed from above and disposing the means in the recess.

BRIEF DESCRIPTION OF THE DRAWINGS

FIG. 2A is a schematic view showing the optical system of the viewfinder, the power unit and the power transmission system employed in the camera shown in FIG. 1, FIG. 2B is a plan view of the optical system of the viewfinder, the power unit and the power transmission system shown in FIG. 2A, FIG. 2C is a cross-sectional view taken along line I—I in FIG. 2A.

DESCRIPTION OF THE PREFERRED EMBODIMENTS

Figure 1:
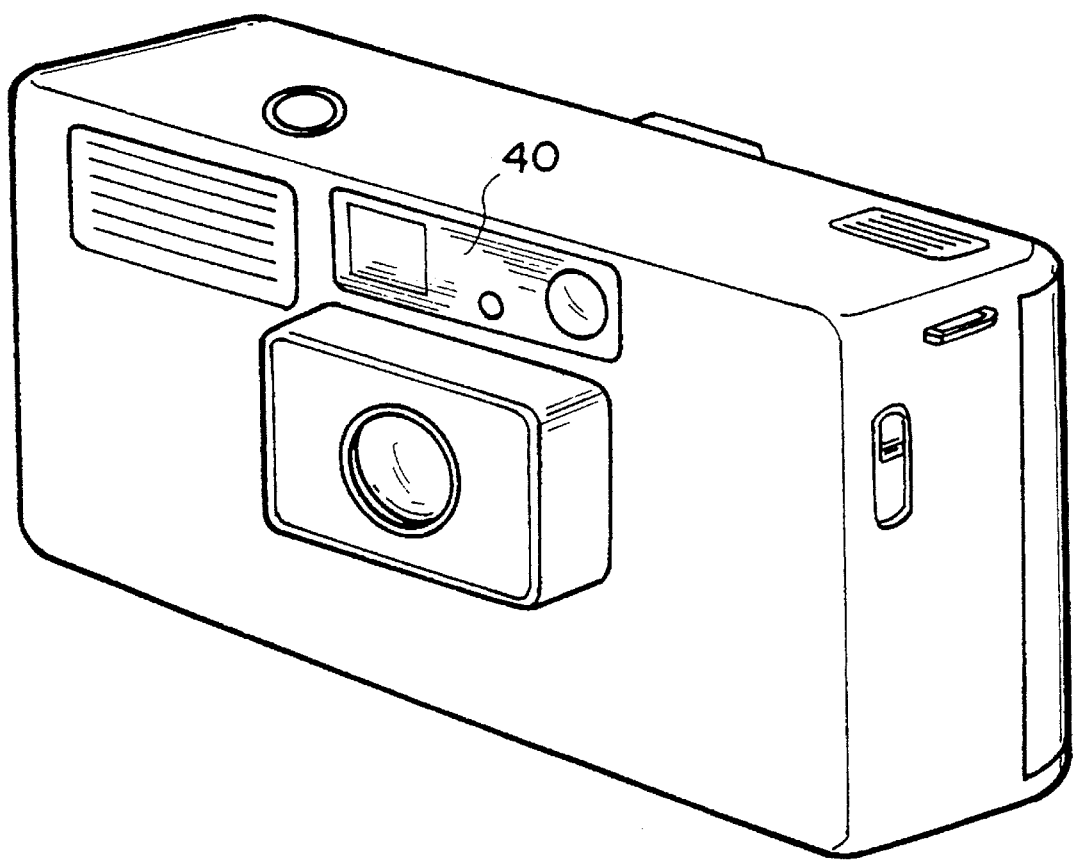
FIG. 1 is a perspective view showing an appearance of a camera in accordance with an embodiment of the present invention.

In FIGS. 1 and 2A to 2C, a camera in accordance with an embodiment of the present invention comprises a film magazine chamber 32 and a film take-up chamber 31 disposed on opposite sides of an optical system 40 of a viewfinder, an electric motor 20 which is disposed in the film take-up chamber 31 and provides power for taking up and rewinding a photographic film, and a gear train 10 for transmitting power from the motor 20 to the film take-up chamber 31 or the film magazine chamber 32.

The gear train 10 comprises a first gear train 11 drivingly engaged with the output shaft of the motor 20, a gear 18, a second gear train 13, a power transmission shaft 15 connected to the second gear train 13 by way of a first pair of bevel gears 14 and a third gear train 17 connected to the power transmission shaft 15 by way of second pair of bevel gears 16. The gear 18 is engaged with a movable gear 12 on the downstream end of the first gear train 11 when the movable gear 12 is moved in the direction of arrow X (FIGS. 2A and 2B). When the gear 18 is engaged with the movable gear 12, the take-up spool (not shown) in the film take-up chamber 31 is driven. The second gear train 13 is engaged with the movable gear 12 when the movable gear 12 is moved in the direction of arrow X'. The shaft of gear on the downstream end of the third gear train is engaged with a film spool (not shown) of a film magazine loaded in the film magazine chamber 32. In the gear train 10, the direction of the rotational axis of the gear train 10 is changed by the bevel gears 14 and by the bevel gears 16.

The power transmission shaft 15 extends left and right in the camera body and is passed through a recess 51 formed in the lower rear portion of the optical system 40 (the lower right portion as seen in FIG. 2C). The first and second bevel gears 14 and 16 which occupy large spaces are disposed in recesses 52 and 53 formed in the optical system 40 on opposite sides thereof as viewed from above.

The shapes of the recesses 51, 52 and 53 need not be limited to those shown in FIGS. 2A to 2C so long as they do not obstruct the path of the light bundle L passing through the optical system 40.

In the camera of this embodiment, the power generated from the motor 20 is transmitted to the first gear train 11. Said movable gear 12 is moved in the direction of arrow X or in the direction of arrow X' in response to movement of a switching means for switching the modes between the film take-up mode and the film rewinding mode. The movable gear 12 is kept engaged with the gear upstream thereof while it is moved in the direction of arrow X or in the direction of arrow X'.

When the movable gear 12 is moved in the direction of arrow X, the driving force of the motor 20 drives the film take-up spool in the film take-up chamber 31 through the first gear train 11 and the movable gear 18, and when the movable gear 12 is moved in the direction of arrow X', the driving force of the motor 20 drives the film spool of the film magazine loaded in the film magazine chamber 32 through the first gear train 11, the second gear train 13, the first pair of bevel gears 14, the power transmission shaft 15, the second pair of bevel gears 16 and the third gear train 17.

Thus in the camera of this embodiment, the power transmission system comprises gear trains and a power transmission shaft 15 and the power transmission shaft 15 is passed through a small recess 51 formed in the optical system 40 of the viewfinder. Accordingly, the power transmission system need not extend beyond the upper or lower edge of the optical system 40 of the viewfinder, whereby the size of the overall camera body can be reduced. Further since the bevel gears 14 and 16 need not extend beyond the left and right edges of the optical system 40 of the viewfinder, the size of the overall camera body can be further reduced.

Figure 3:
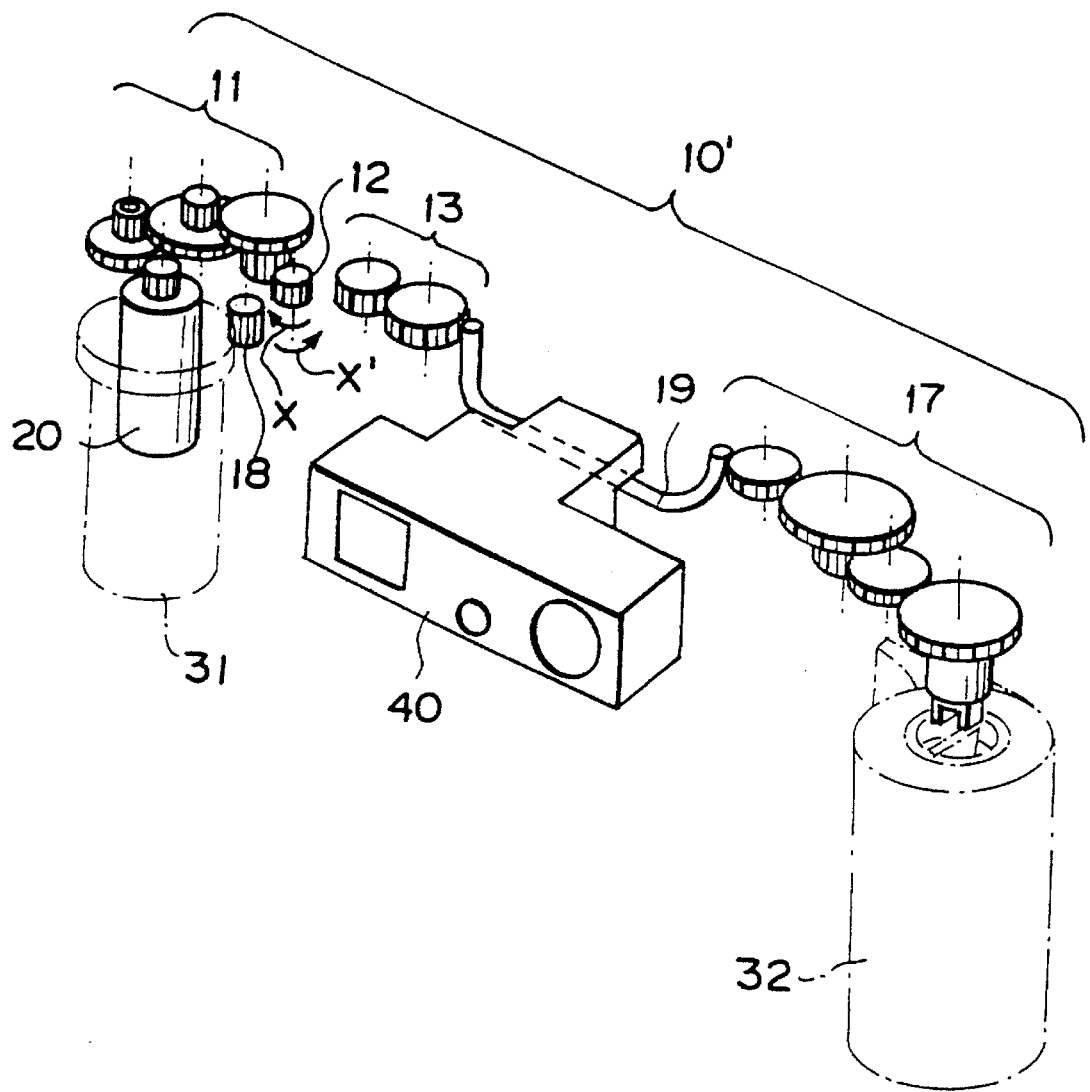
FIG. 3 is a view similar to FIG. 2 but showing another embodiment of the present invention.

In another embodiment shown in FIG. 3, the second gear train 13 is connected to the third gear train 17 by way of a flexible power transmission shaft 19 which is provided with teeth which are formed at the respective end portions thereof and are in mesh with second and third gear trains 13 and 17. When such a flexible power transmission shaft is used, bevel gears 14 and 16 (for changing the direction of the rotational axis) employed in the preceding embodiment can be eliminated, and the space factor can be further improved.

What is claimed is:

1. A compact photographic camera comprising a film magazine chamber and a film take-up chamber disposed on opposite sides of an optical system of a viewfinder that is optically isolated from a photographic lens of said camera and includes an upper surface that is coplanar with a body of said photographic camera, and a gear train for transmitting power such as that for taking up the film between the film magazine chamber and the film take-up chamber, wherein the improvement comprises that said gear train has a power transmission shaft which has a length sufficient to extend across the optical system of the viewfinder and extends from said film magazine chamber to said film take-up chamber, and a recess is formed in a contour of the optical system of the viewfinder as viewed from a side of the optical system, with the power transmission shaft extending through the recess.

2. A photographic camera as defined in claim 1 in which said power transmission shaft is connected to each of the portions of the gear train on opposite sides of the optical system of the viewfinder by way of a means for changing the direction of the rotational axis of the gear train, and the optical system of the viewfinder is provided with a recess on each side thereof as viewed from above and said means for changing the direction of the rotational axis of the gear train is disposed in the recess.

* * * * *